(12) United States Patent
Nishiyama (10) Patent No.: US 7,575,108 B2
(45) Date of Patent: Aug. 18, 2009

(54) DAMPER

(75) Inventor: Masayuki Nishiyama, Hiroshima (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 369 days.

(21) Appl. No.: 11/783,790

(22) Filed: Apr. 12, 2007

(65) Prior Publication Data

US 2008/0253893 A1 Oct. 16, 2008

(51) Int. Cl.
*F16D 57/00* (2006.01)
*F16F 5/00* (2006.01)

(52) U.S. Cl. ..................... 188/290; 188/307

(58) Field of Classification Search ............ 188/290, 188/293, 294, 296, 306, 307, 308, 310; 464/180
See application file for complete search history.

(56) References Cited

U.S. PATENT DOCUMENTS

| | | | | |
|---|---|---|---|---|
| 5,152,189 A | * | 10/1992 | Miura et al. | 464/180 |
| 5,720,370 A | * | 2/1998 | Takahashi | 188/310 |
| 7,322,450 B2 | * | 1/2008 | Orita | 188/296 |
| 2002/0179387 A1 | * | 12/2002 | Orita | 188/290 |
| 2003/0150678 A1 | * | 8/2003 | Iwashita | 188/296 |
| 2003/0234145 A1 | * | 12/2003 | Iwashita | 188/290 |
| 2006/0289257 A1 | * | 12/2006 | Orita | 188/290 |

FOREIGN PATENT DOCUMENTS

| | | |
|---|---|---|
| JP | 22882109 | 2/1999 |
| JP | 3053156 | 4/2000 |
| JP | 3125416 | 11/2000 |

* cited by examiner

*Primary Examiner*—Melody M Burch
(74) *Attorney, Agent, or Firm*—Manabu Kanesaka (57) ABSTRACT

A damper includes a cylindrical housing, a rotor rotatably disposed in the housing and having a cylindrical shaft portion and a wing portion radially outwardly extending from the shaft portion, a control valve member disposed between the housing and the shaft portion to cover the wing portion, and a viscous fluid filled inside the housing. The wing portion has an asymmetric shape with respect to a rotational direction of the rotor relative to a straight line extending radially from the shaft portion. The wing portion includes a tip side surface, and a back end side surface. The control valve member includes a first inner surface facing a sloping surface parallel thereto, and a second inner surface facing a flat surface parallel thereto.

8 Claims, 6 Drawing Sheets

DAMPER

BACKGROUND OF THE INVENTION AND RELATED ART STATEMENT

The invention relates to a damper which generates a damping torque only when a rotor rotates or turns relative to a housing in a damping torque generating direction.

Conventionally, the above-mentioned damper includes a cylindrical housing; a rotor having a cylindrical shaft portion and wing portions formed on a part of the shaft portion and extending in a radial direction, the rotor being rotatably housed in the housing; control valve members, each being disposed between the housing and the part of the shaft portion and covering the wing portion; and a viscous fluid filled inside the housing. In this damper, the rotor rotates relative to the housing in a damping torque generating direction, so that the control valve members move relative to the rotor in a counter-damping torque generating direction, and block circulation passages for the viscous fluid. Accordingly, the damper assumes a damping state generating a damping torque. Also, the rotor rotates relative to the housing in the counter-damping torque generating direction, so that the control valve members move relative to the rotor in the damping torque generating direction, and open the circulation passages for the viscous fluid. Accordingly, the damper assumes a non-damping state. (Refer to Japanese Patents No. 2882109, No. 3125416 and No. 3053156).

However, the above-mentioned conventional damper is a one-way damper wherein the wing portions are formed in a symmetric shape with respect to a rotational direction relative to a straight line extending radially from the shaft portion; the control valve members are formed in a C-shape in a cross sectional view; and the moving distance of the control valve members is enlarged. As a result, the moving distance relative to the rotor (wing portions) of the control valve members becomes longer during a reverse movement from the damping state to the non-damping state, or from the non-damping state to the damping state.

Therefore, during the reverse movement from the damping state to the non-damping state, or from the non-damping state to the damping state, the play (moving distance) of the control valve members becomes longer, so that response of the control valve members deteriorates.

This invention is made in order to solve the above-mentioned problem, and an object of the invention is to provide a damper, in which the play (moving distance) of the control valve member can be shortened, so that it is possible to provide a damper with excellent response.

Further objects and advantages of the invention will be apparent from the following description of the invention.

SUMMARY OF THE INVENTION

In a first aspect of the invention, a damper includes a cylindrical housing; a rotor rotatably disposed in the housing, and having a cylindrical shaft portion and a wing portion formed on the shaft portion in a radial direction; a control valve member disposed between the housing and a part of the shaft portion and covering the wing portion; and a viscous fluid filled inside the housing. The rotor rotates relative to the housing in a damping torque generating direction, so that the control valve member moves relative to the rotor in a counter-damping torque generating direction, and blocks a circulation passage for the viscous fluid. Accordingly, the damper assumes a damping state generating a damping torque. Also, the rotor rotates relative to the housing in the counter-damping torque generating direction, so that the control valve member moves relative to the rotor in the damping torque generating direction, and opens the circulation passage for the viscous fluid. Accordingly, the damper assumes a non-damping state.

The wing portion is formed in an asymmetric shape with respect to a rotational direction relative to a straight line extending radially from the shaft portion. The tip side surface of the wing portion which is located on the tip side of the rotational direction when the rotor rotates in the damping torque generating direction, becomes a sloping surface which slopes to the back end side of the rotational direction from the tip side toward outside of the radial direction from the inside of the radial direction. The back end side surface of the wing portion which is located on the back end side of the rotational direction when the rotor rotates in the damping torque generating direction, becomes a flat surface which runs parallel to the straight line extending radially. The inner surface of the control valve member which faces the sloping surface, is a parallel sloping surface which runs parallel to the sloping surface, and the inner surface of the control valve member which faces the flat surface, is a parallel flat surface which runs parallel to the flat surface.

In a second aspect of the damper, according to the first aspect of the invention, the width of the tip portion of the control valve member with the parallel sloping surface, which is perpendicular to the shaft of the shaft portion, widens toward the outside of the radial direction from the inside of the radial direction.

In a third aspect of the damper, according to the first or second aspect of the invention, a protruding wall extending in a circumferential direction is provided in the tip portion of the control valve member with the parallel sloping surface.

In a fourth aspect of the damper, according to the third aspect of the invention, the protruding wall contacts the inner perimeter surface of the housing.

In a fifth aspect of the damper, according to the first aspect of the invention, the heat expansion coefficient of the control valve member is below the heat expansion coefficient of the housing or the rotor.

According to the invention, the wing portion is formed in an asymmetric shape with respect to the rotational direction relative to the straight line extending radially from the shaft portion. The tip side surface of the wing portion which is located on the tip side of the rotational direction when the rotor rotates in the damping torque generating direction, becomes the sloping surface which slopes to the back end side of the rotational direction from the tip side toward the outside of the radial direction from the inside of the radial direction. The back end side surface of the wing portion which is located on the back end side of the rotational direction when the rotor rotates in the damping torque generating direction, becomes the flat surface which runs parallel to the straight line extending radially. Also, the inner surface of the control valve member which faces the sloping surface, is the parallel sloping surface which runs parallel to the sloping surface, and the inner surface of the control valve member which faces the flat surface, is the parallel flat surface which runs parallel to the flat surface. Accordingly, even if the moving distance relative to the rotor (wing portion) of the control valve member is shortened, the circulation passage for the viscous fluid can be sufficiently maintained.

Therefore, the play of the control valve member can be shortened, so that the response of the control valve member improves.

The width of the tip portion of the control valve member with the parallel sloping surface, which is perpendicular to the shaft of the shaft portion, widens toward the outside of the radial direction from the inside of the radial direction. Accordingly, the length of the circumferential direction of the control valve member contacting the inner perimeter surface of the housing is prolonged or extended, so that the posture of the control valve member is stabilized, and its operation is stabilized.

In addition, the protruding wall extending in the circumferential direction is provided in the tip portion of the control valve member with the parallel sloping surface. Accordingly, pressurized viscous fluid in a damped state pushes the protruding wall in the radial direction and presses the control valve member against the inner perimeter surface of the housing. As a result, the posture of the control valve member is additionally stabilized.

Moreover, since the protruding wall contacts the inner perimeter surface of the housing, the posture of the control valve member is stabilized further.

Also, since the heat expansion coefficient of the control valve member is made below the heat expansion coefficient of the housing or the rotor, even if the temperature rises and the viscosity of the viscous fluid decreases, because orifices (gaps between the housing and the control valve member, and between the rotor and the control valve member) narrow, variation in the damping torque can be controlled.

DETAILED DESCRIPTION OF PREFERRED EMBODIMENTS

Hereunder, embodiments of the invention will be explained with reference to the accompanying drawings.

Figure 1:
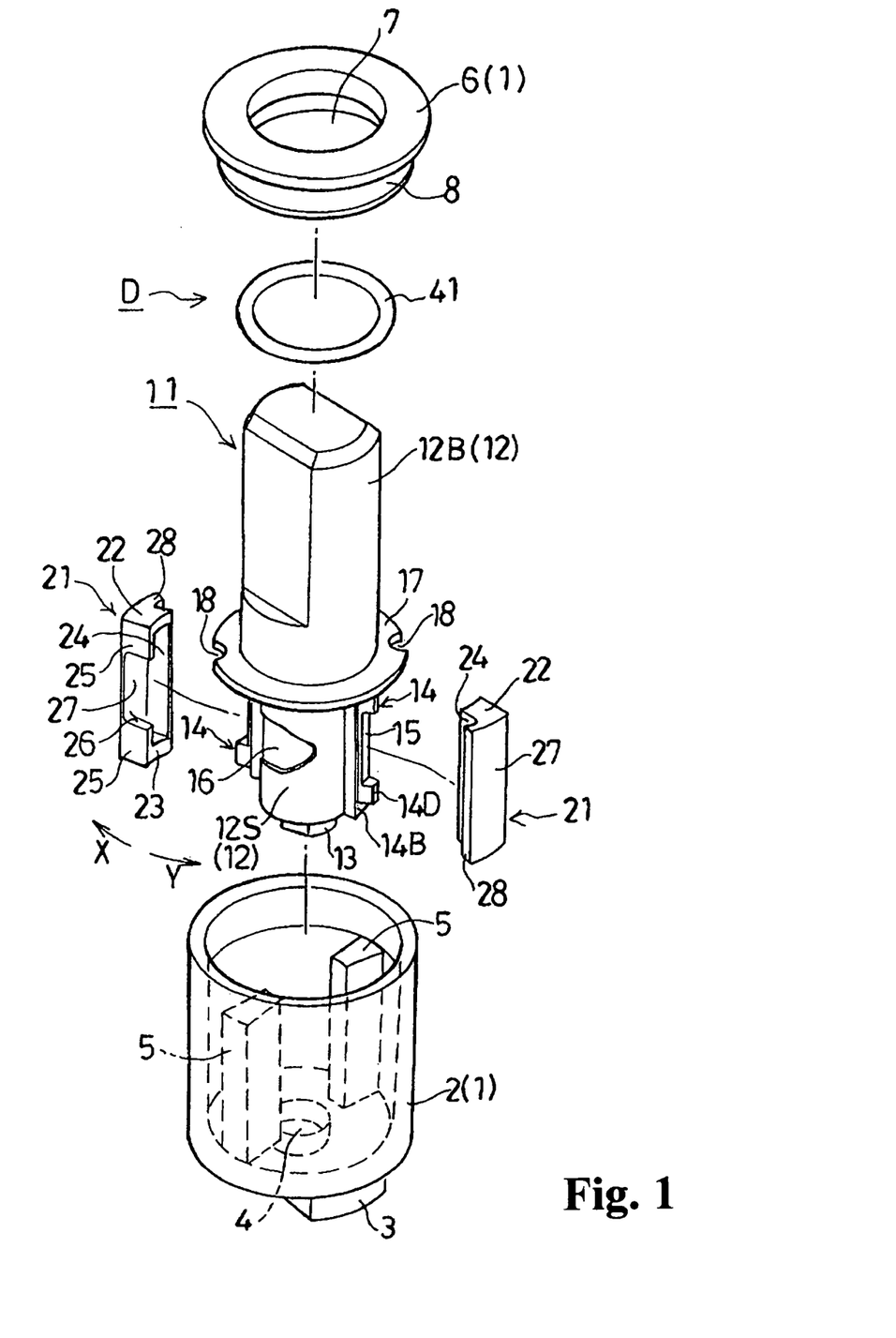
FIG. 1 is an exploded perspective view of a damper according to an embodiment of the invention.
Figures 2A, 2B:
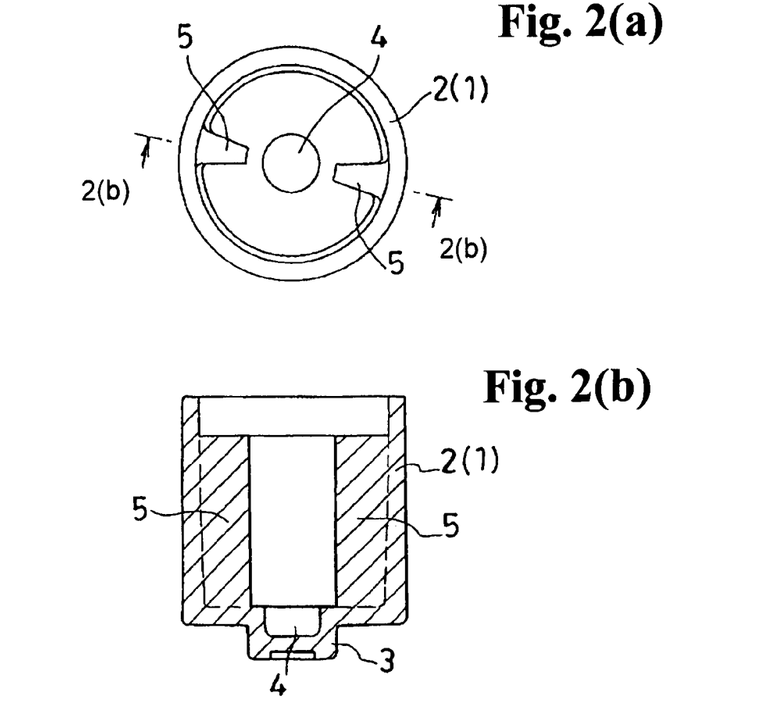
FIG. 2(a) is a plan view of a housing main body shown in FIG. 1.
FIG. 2(b) is a cross sectional view taken along line 2(b)-2(b) in FIG. 2(a)
Figures 3A, 3B:
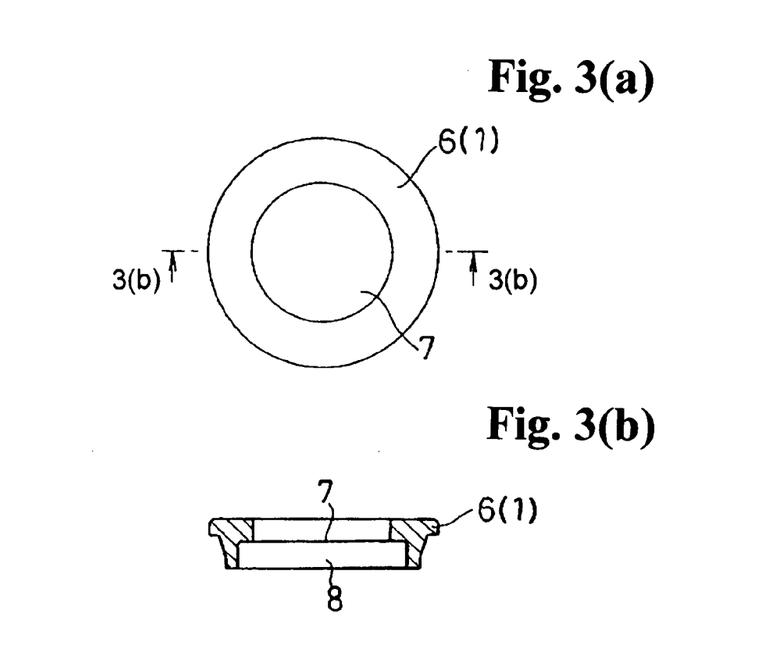
FIG. 3(a) is a plan view of a cap shown in FIG. 1.
FIG. 3(b) is a cross sectional view taken along line 3(b)-3(b) in FIG. 3(a)
Figure 4A:
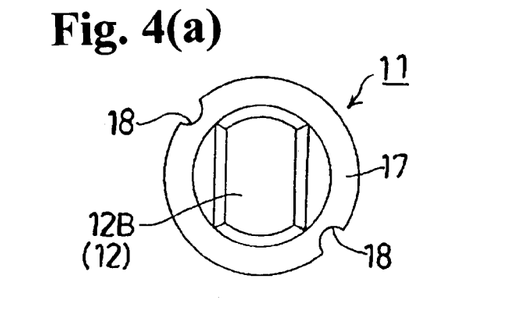
FIG. 4(a) is a plan view of a rotor shown in FIG. 1.
Figure 4B:
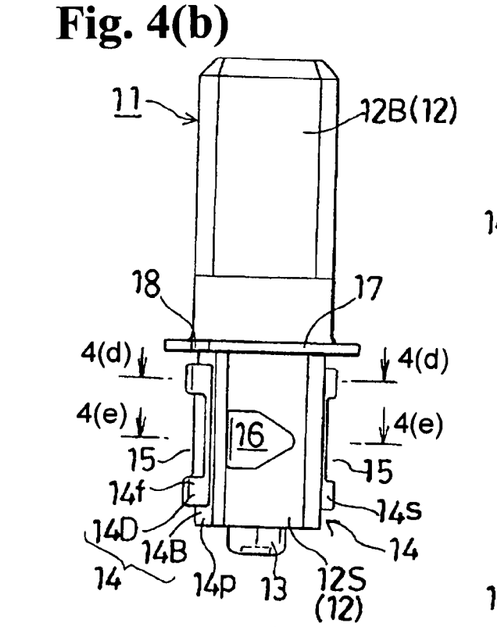
FIG. 4(b) is a right side view of the rotor shown in FIG. 1.
Figure 4C:
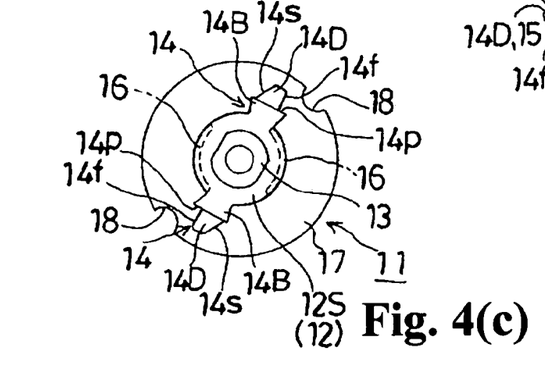
FIG. 4(c) is a bottom plan view of the rotor shown in FIG. 1.
Figure 4D:
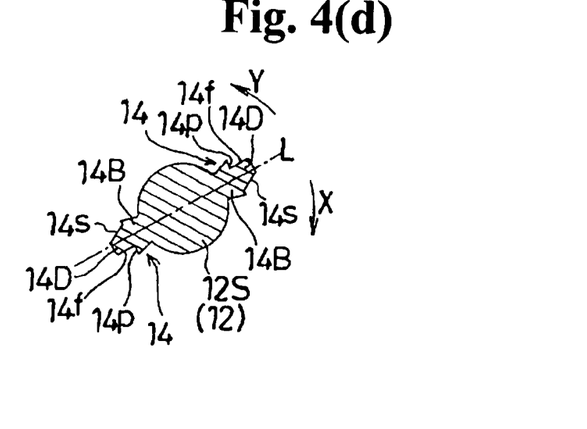
FIG. 4(d) is a cross sectional view taken along line 4(d)-4(d) in FIG. 4(b)
Figure 4E:
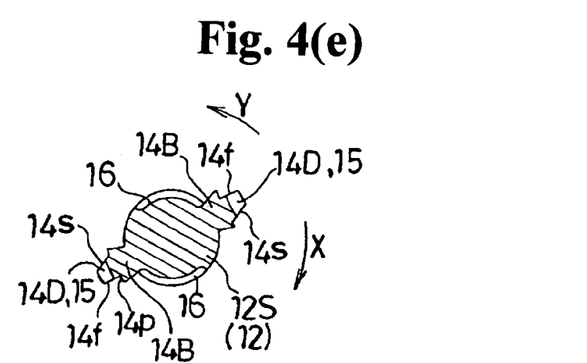
FIG. 4(e) is a cross sectional view taken along line 4(e)-4(e) in FIG. 4(b)
Figure 5A:
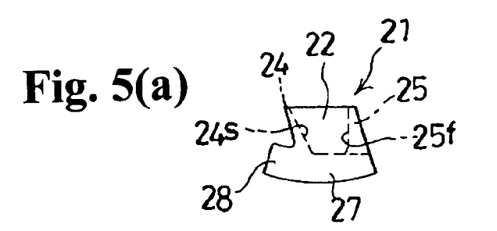
FIG. 5(a) is an enlarged plan view of a control valve member shown in FIG. 1.
Figure 5B:
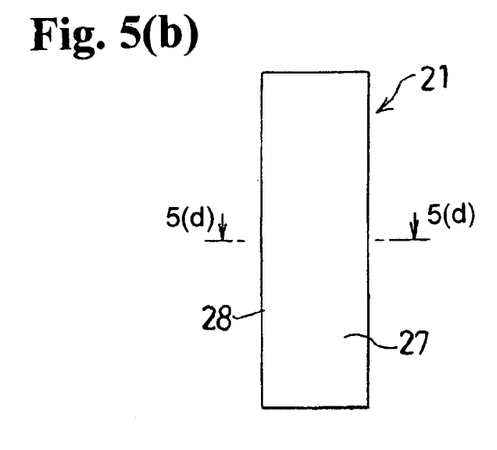
FIG. 5(b) is an enlarged front view of the control valve member shown in FIG. 1.
Figure 5C:
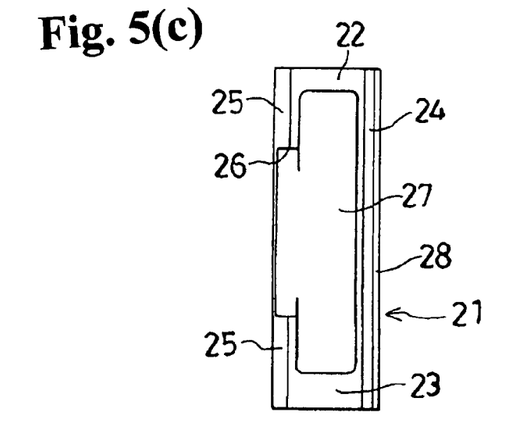
FIG. 5(c) is an enlarged rear view of the control valve member shown in FIG. 1.
Figure 5D:
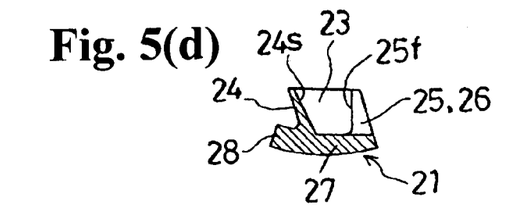
FIG. 5(d) is a cross sectional view taken along line 5(d)-5(d) in FIG. 5(b)
Figure 6:
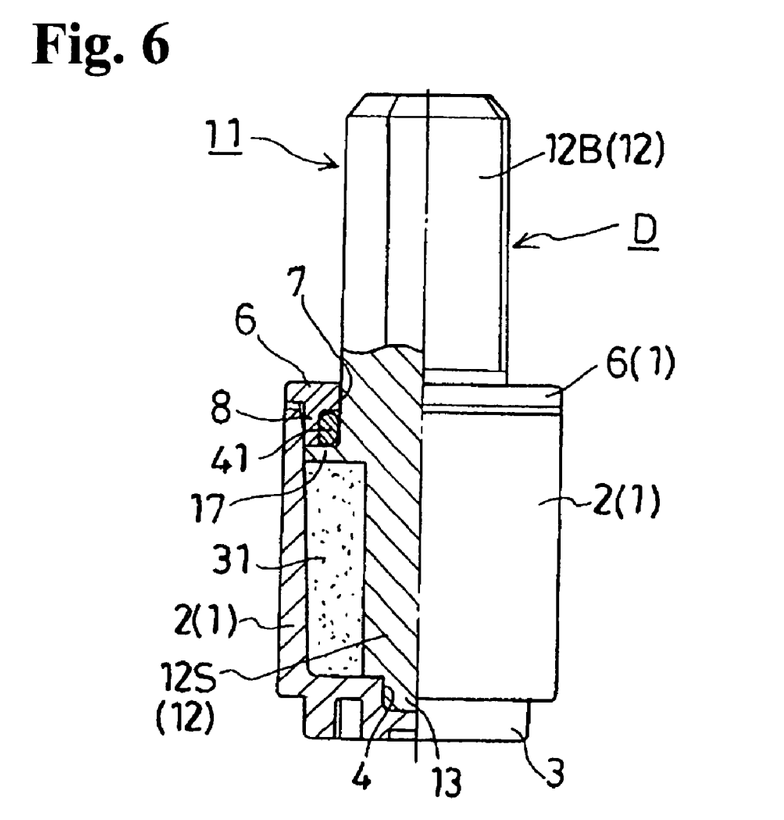
FIG. 6 is a partially cross-sectional side view surface of the damper according to the embodiment of the invention.
Figure 7:
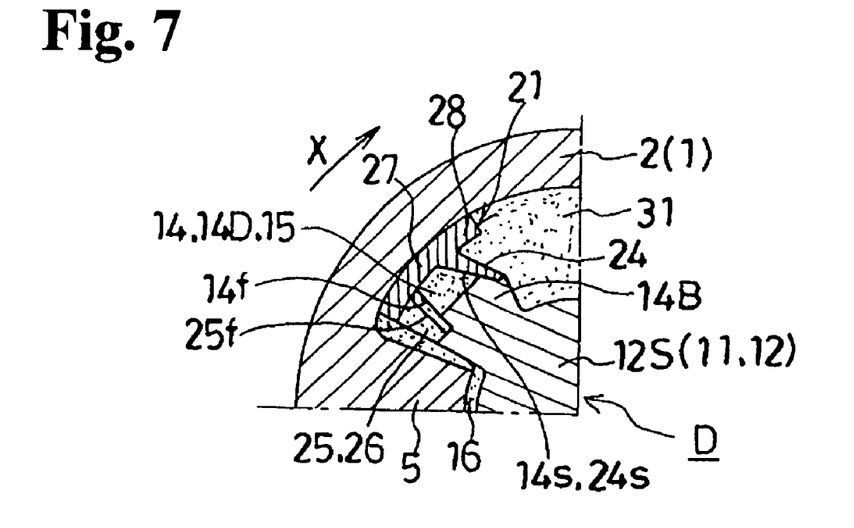
FIG. 7 is an operating explanatory drawing.
Figure 8:
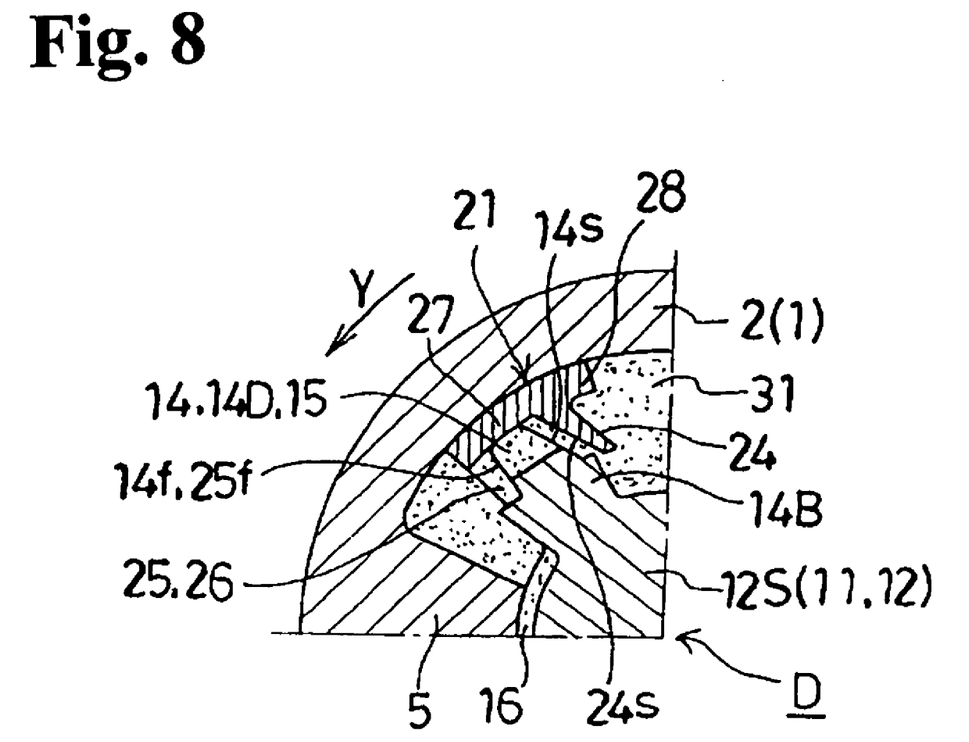
FIG. 8 is an operating explanatory drawing.

FIG. 1 is an exploded perspective view of a damper according to an embodiment of the invention; FIG. 2(a) is a plan view of a housing main body shown in FIG. 1, and FIG. 2(b) is a cross sectional view taken along line 2(b)-2(b) in FIG. 2(a); FIG. 3(a) is a plan view of a cap shown in FIG. 1, and FIG. 3(b) is a cross sectional view taken along line 3(b)-3(b) in FIG. 3(a); FIG. 4(a) is a plan view of a rotor shown in FIG. 1, FIG. 4(b) is a right side view of the rotor shown in FIG. 1, FIG. 4(c) is a bottom plan view of the rotor shown in FIG. 1, FIG. 4(d) is a cross sectional view taken along line 4(d)-4(d) in FIG. 4(b), and FIG. 4(e) is a cross sectional view taken along line 4(e)-4(e) in FIG. 4(b); FIG. 5(a) is an enlarged plan view of a control valve member shown in FIG. 1, FIG. 5(b) is an enlarged front view of the control valve member shown in FIG. 1, FIG. 5(c) is an enlarged rear view of the control valve member shown in FIG. 1, and FIG. 5(d) is a cross sectional view taken along line 5(d)-5(d) in FIG. 5(b); FIG. 6 is a side view of the cross-sectional surface of a part of the left side of the damper according to the embodiment of the invention; and FIGS. 7, 8 are operating explanatory drawings.

In FIG. 1, a damper D includes a cylindrical housing 1; a rotor 11 whose one part is rotatably housed inside the housing 1; control valve members 21 disposed between the rotor 11 and the housing 1; a viscous fluid 31 (refer to FIG. 6) such as silicone oil and grease filled inside the housing 1; and an O-ring 41 to prevent leakage of the viscous fluid 31 between the housing 1 and the rotor 11. Incidentally, the housing 1, rotor 11, and control valve members 21 are molded by a mixture of equal parts of polyamide 66 and glass fiber, respectively.

As shown in FIG. 1, the housing 1 includes a housing main body 2 and a cap 6 for closing an opening of the housing main body 2. As shown in FIGS. 1, 2(a) and 2(b), the housing main body 2 has a cylindrical shape whose ceiling is open (opening), and whose inner area is formed such that an inner circumference surface of the housing main body 2 extends downwardly, and a lower portion of the inner circumference surface inclines slightly inwardly to the bottom to have a conical trapezoid shape. An engaged projection 3 is provided on the outside of the bottom in such a way not to project outwardly in the radial direction thereof. A shaft support hole 4 rotatably supporting the rotor 11 is provided in the center of the inside of the bottom. Rotational control walls 5 are provided symmetrically in the inner perimeter such that the rotational control walls 5 extend to the slightly lower side than the upper end from the bottom and face each other with a predetermined distance.

Also, as shown in FIGS. 1, 3(a) and 3(b), a through-hole 7 is provided at the center of the cap 6 for rotatably inserting the rotor 11, and an encircling annular wall 8 is provided around a lower peripheral border of the through-hole 7.

As shown in FIGS. 1 and 4(b), the rotor 11 includes a cylindrical shaft portion 12, and a disk-like flange 17 provided around the shaft portion 12 and inserted into the housing main body 2. Also, the shaft portion 12 includes a small diameter shaft portion 12S and a large diameter shaft portion 12B. The small diameter shaft portion 12S has a height same as that of the rotational control walls 5 provided in the housing main body 2. The large diameter shaft portion 12B is arranged concentrically with the small diameter shaft portion 12S; continues to the upper side of the small diameter shaft portion 12S; and has an I-cut section from the middle to the upper end. As shown in FIGS. 1 and 4(a)-4(e), the small diameter shaft portion 12S has a protruding shaft 13 rotatably supported by the shaft support hole 4 of the housing main body 2 in the center of the bottom. Wing portions 14 are provided symmetrically on the outer perimeter to extend in an axial direction.

As shown in FIGS. 4(c) and 4(d), the wing portion 14 includes a trapezoidal platform 14B in a plan view expanding outwardly; and a wing portion main body 14D provided on the outside of the platform 14B in such a way as to form a supporting surface 14p on the outer perimeter of the platform 14B. As shown in FIG. 4(d), the platforms 14B are arranged symmetrically with respect to a rotational direction relative to a straight line L extending radially from the small diameter shaft portion 12S.

As shown in FIG. 4(*d*), the wing portion main body 14D is formed in an asymmetric shape with respect to the rotational direction relative to the straight line L extending radially from the small diameter shaft portion 12S. The tip side surface located on the tip side of the rotational direction when the rotor 11 rotates in a damping torque generating direction X, become a sloping surface 14*s* which slopes from the tip side of the rotational direction toward the outside of the radial direction from the inside of the radial direction. The back end side surface located on the back end side of the rotational direction when the rotor 11 rotates in the damping torque generating direction X, become a flat surface 14*f* which runs parallel to the straight line L extending radially.

Additionally, as shown in FIGS. 1, 4(*b*) and 4(*e*), the wing portion main body 14D includes a cut-out 15 forming a circulation passage for the viscous fluid 31.

As shown in FIGS. 1, 4(*b*) and 4(*e*), the small diameter shaft portion 12S includes baseball home plate-like depressions 16 extending in a counter-damping torque generating direction Y from the wing portions 14, behind the cut-outs 15 when the rotor 11 rotates in the damping torque generating direction X.

Incidentally, as shown in FIGS. 1 and 4(*b*), the disk-like flange 17 is provided on the outer perimeter of the lower end of the large diameter shaft portion 12B. As shown in FIGS. 1, 4(*a*) and 4(*c*), air vent cut-outs 18 are provided symmetrically in a marginal position.

As shown in FIGS. 1 and 5(*c*), the control valve member 21 includes an upper side wall 22; a lower side wall 23; a tip side wall 24 as a tip portion located on the tip side of the rotational direction when the rotor 11 rotates in the damping torque generating direction X; back end side walls 25 as back end side portions located at the back end side of the rotational direction when the rotor 11 rotates in the damping torque generating direction X; and a circular wall 27 contacting the inner perimeter surface of the housing main body 2. The control valve member 21 is constituted in such a way as to cover the wing portion main body 14D of the rotor 11.

As shown in FIGS. 1, 5(*a*) and 5(*d*), the tip side wall 24 includes a protruding wall 28 extending in a circumferential direction of the tip side when the rotor 11 rotates in the damping torque generating direction X and contacting the inner perimeter surface of the housing main body 2.

As shown in FIG. 5(*d*), the width of the tip side wall 24 (cross sectional) perpendicular to the shaft of the shaft portion 12 widens toward the outside of the radial direction from the inside of the radial direction.

As shown in FIG. 5(*d*), an inner surface of the tip side wall 24 which faces the sloping surface 14*s* of the wing portion 14, is a parallel sloping surface 24*s* which runs parallel to the sloping surface 14*s* to contact and separate relative to the sloping surface 14*s*.

Also, as shown in FIG. 5(*d*), the inner surfaces of the back end side walls 25 which face the flat surfaces 14*f* of the wing portions 14, are parallel flat surfaces 25*f* which run parallel to the flat surfaces 14*f* to contact and separate relative to the flat surfaces 14*f*.

Incidentally, as shown in FIGS. 1, 5(*c*) and 5(*d*), the back end side walls 25 include a cut-out 26 forming a circulation passage for the viscous fluid 31 to correspond to the cut-out 15 of the wing portion 14. The thickness of the upper side wall 22 corresponds to a space between the wing portion 14 and the disk-like flange 17, and the thickness of the lower side wall 23 is thicker than the thickness of the upper side wall 22.

Therefore, incorrect attachment of the control valve members 21 is prevented. Also, outer perimeter surfaces of the circular walls 27 and the protruding walls 28 are conical perimeter surfaces which contact the inner perimeter surface of the housing main body 2.

Next, one example of assembly will be explained.

First, the housing main body 2 is fixed to have an open end (opening) side up, and a proper amount of the viscous fluid 31 is filled into the housing main body 2. The large diameter shaft portion 12B is fitted into the O-ring 41 to contact the disk-like flange 17. The viscous fluid 31 is applied to the small diameter shaft portion 12S, the lower surface of the disk-like flange 17, and the control valve members 21. After the control valve members 21 are attached to the wing portions 14 in such a way as to cover the wing portion main bodies 14D, the shaft portion 12 is inserted into the housing main body 2 from a protruding shaft 13 side. In this way when the shaft portion 12 is inserted into the housing main body 2, the protruding shaft 13 is rotatably fitted into the shaft support hole 4, and the disk-like flange 17 abuts against the upper surfaces of the rotational control walls 5. At the same time, air in the part which is divided by the housing main body 2 and the disk-like flange 17 goes out of the air vent cut-outs 18.

Next, the large diameter shaft portion 12B is inserted into the through-hole 7 with the encircling cyclic wall 8 being oriented down, and the cap 6 is pressed downwardly. By applying predetermined pressure, the O-ring 41 is transformed, and this prevents leakage of the viscous fluid 31 between the housing 1 and the rotor 11. Also, the opening of the housing main body 2 is closed by the cap 6. In this state, the upper end of the housing main body 2 and the lower surface outer edge of the cap 6 are sealed tightly by, for example, high-frequency welding. Consequently, as shown in FIG. 6, the damper D can be completely assembled.

Incidentally, when the damper D is assembled, the wing portions 14 and the control valve members 21 divides the rotational control walls 5 of the housing 1 into two. Next, an operation will be explained with reference to FIGS. 7 and 8.

Incidentally, the damper D is fixed at the engagement projection 3, so that the housing 1 does not rotate.

First, as shown in FIG. 7, when a force making the rotor 11 rotate in the damping torque generating direction X (clockwise) acts on the large diameter shaft portion 12B, the wing portions 14 also rotate simultaneously in the damping torque generating direction X.

However, since the control valve member 21 covering the wing portion main body 14D receives resistance from the viscous fluid 31, the sloping surface 14*s* contacts the parallel sloping surface 24*s*, and the tip side wall 24 is pushed by the wing portion main body 14D. As a result, as shown in FIG. 7, the control valve member 21 rotates with the wing portion 14.

By this means, when the sloping surface 14*s* contacts the parallel sloping surface 24*s* and the wing portion main body 14D contacts the tip side wall 24, the cut-out 15 is blocked by the tip side wall 24, so that the viscous fluid 31 which is located inside the right-side divided part (tip side wall 24 side) rather than the wing portion 14 in FIG. 7, is applied with pressure. This pressurized viscous fluid 31 presses the protruding wall 28 against the inner perimeter surface of the housing main body 2.

Therefore, the pressurized viscous fluid 31 passes through gaps (orifices) between the housing main body 2 and the disk-like flange 17, and between the wing portion 14 and the control valve member 21, and flows to the left-side divided part (back end side walls 25 side) rather than the wing portions 14. As a result, clockwise rotation of the rotor 11 is damped.

Next, as shown in FIG. 8, when a force making the rotor 11 rotate in the counter-damping torque generating direction Y (counterclockwise) acts on the large diameter shaft portion 12B, the wing portion 14 also rotates simultaneously in the counter-damping torque generating direction Y. However, since the control valve member 21 covering the wing portion main body 14D receives the resistance from the viscous fluid 31, the flat surfaces 14f contact the parallel flat surfaces 25f, and the back end side wall 25 is pushed by the wing portion main body 14D. As a result, as shown in FIG. 8, the control valve members 21 rotate with the wing portions 14.

By this, when the flat surfaces 14f contact the parallel flat surfaces 25f and the wing portion main bodies 14D contact the back end side walls 25, the cut-out 15 blocked by the tip side walls 24 open. Consequently, since the sloping surfaces 14s and the parallel sloping surfaces 24s extend parallel, the space between the sloping surfaces 14s and the parallel sloping surfaces 24s is sufficiently maintained. Therefore, the viscous fluid 31 which is located inside the left-side divided part (back end side walls 25 side) relative to the wing portion 14 in FIG. 8, is applied with pressure. This pressurized viscous fluid 31 passes through the circulation passages (cut-out 26, cut-out 15, between the wing portions 14 and the tip side walls 24), and flows to the right-side divided part (tip side wall 24 side) relative to the wing portion 14. As a result, counter-clockwise rotation of the rotor 11 is not damped well.

As mentioned above, according to one embodiment of the invention, the wing portions 14 are formed asymmetrically with respect to a rotational direction relative to the straight line L extending radially from the small diameter shaft portion 12S. The tip side surface of the wing portion 14 (wing portion main body 14D) which is located on the tip side of the rotational direction when the rotor 11 rotates in the damping torque generating direction X, becomes the sloping surface 14s which slopes to the back end side of the rotational direction from the tip side of the rotational direction toward the outside of the radial direction from the inside of the radial direction. The back end side surface of the wing portion 14 (wing portion main body 14D) which is located on the back end side of the rotational direction when the rotor 11 rotates in the damping torque generating direction X, become the flat surface 14f which runs parallel to the straight line L extending radially.

Also, inner surface of the control valve member 21 which faces the sloping surface 14s, is the parallel sloping surface 24s which runs parallel to the sloping surfaces 14s. The inner surface of the control valve members 21 which faces the flat surface 14f, is the parallel flat surface 25f which runs parallel to the flat surface 14f. As a result, even if the moving distance relative to the rotor 11 (wing portions 14) of the control valve members 21 is made short, the circulation passage for the viscous fluid 31 can be sufficiently maintained.

Therefore, the play of the control valve members 21 can be shortened, so that response of the control valve members 21 improves. The cross sectional width of the tip portion of the control valve member 21 with the parallel sloping surface 24s, which is perpendicular to the shaft of the shaft portion 12, is widened toward the outside of the radial direction from the inside of the radial direction, so that the length of the circumferential direction of the control valve member 21 contacting the inner perimeter surface of the housing 1 is prolonged. As a result, the posture of the control valve member 21 is stabilized, and their operation is stabilized.

In addition, the protruding wall 28 extending in a circumferential direction is provided in the tip portion of the control valve member 21 with the parallel sloping surface 24s. Accordingly, the pressurized viscous fluid 31 in a damped state pushes the protruding wall 28 in the radial direction and presses the control valve member 21 against the inner perimeter surface of the housing 1. As a result, the posture of the control valve member 21 is further stabilized.

Moreover, since the protruding wall 28 contacts the inner perimeter surface of the housing 1, the posture of the control valve member 21 is stabilized further.

Also, the heat expansion coefficient of the control valve members 21 is the same as the heat expansion coefficient of the housing 1 and the rotor 11, so that even if the temperature rises and the viscosity of the viscous fluid 31 decreases, because the orifices (gaps between the housing 1 and the control valve members 21, and between the rotor 11 and the control valve members 21) narrow, variation in the damping torque can be controlled.

In the embodiment, the example wherein the heat expansion coefficient of the control valve members 21 is the same as the heat expansion coefficient of the housing 1 and the rotor 11, is shown. However, even if the heat expansion coefficient of the control valve members 21 is below the heat expansion coefficient of the housing 1 or the rotor 11, the same effect can be obtained. Also, the example of the damper D wherein the rotational range of the rotor 11 is below 180° is shown. However, by eliminating the rotational control walls 5, the damper can rotate more than 360°.

The disclosure of Japanese Patent Application No. 2005-060416, filed on Mar. 4, 2005, is incorporated in the application.

While the invention has been explained with reference to the specific embodiments of the invention, the explanation is illustrative and the invention is limited only by the appended claims.

What is claimed is:

1. A damper comprising:
   a cylindrical housing;
   a rotor rotatably disposed in the housing, and having a cylindrical shaft portion and a wing portion radially outwardly extending from the shaft portion;
   a control valve member disposed between the housing and the shaft portion to cover the wing portion; and
   a viscous fluid filled inside the housing;
   wherein the wing portion has an asymmetric shape with respect to a rotational direction of the rotor relative to a straight line extending radially from the shaft portion;
   the wing portion includes a tip side surface located on a tip side in the rotational direction when the rotor rotates in a damping torque generating direction, said tip side surface forming a sloping surface sloping rearwardly in the rotational direction from an inside to an outside radially of the rotor; and a back end side surface located on a back end side in the rotational direction when the rotor rotates in the damping torque generating direction, said back end side surface forming a flat surface which runs parallel to the straight line extending radially of the rotor; and
   the control valve member includes a first inner surface facing the sloping surface parallel thereto, and a second inner surface facing the flat surface parallel thereto.

2. A damper according to claim 1, wherein the rotor is arranged such that the rotor rotates relative to the housing in the damping torque generating direction so that the control valve member moves relative to the rotor in a counter-damping torque generating direction, and blocks a circulation passage for the viscous fluid; and the rotor rotates relative to the housing in the counter-damping torque generating direction so that the control valve member moves relative to the rotor in the damping torque generating direction and opens the circulation passage for the viscous fluid.

3. A damper according to claim 1, wherein the control valve member has a tip portion with the parallel sloping surface, said tip portion having a width perpendicular to the shaft portion, said width being widened radially outward from an inside thereof.

4. A damper according to claim 3, wherein the tip portion includes a protruding wall extending in a circumferential direction.

5. A damper according to claim 4, wherein the protruding wall contacts an inner perimeter surface of the housing.

6. A damper according to claim 1, wherein the control valve member is made of a material having a heat expansion coefficient less than that of the housing or the rotor.

7. A damper according to claim 1, wherein said wing portion includes main bodies and a cut-out portion between the main bodies, and said control valve member includes a tip side wall, back end side walls, and a space therebetween, said cut-out portion being blocked by the tip side wall when the rotor is rotated in the damping torque generating direction.

8. A damper according to claim 7, wherein said cylindrical shaft portion of the rotor includes a depression at a circumference thereof.

* * * * *